INVENTOR:
JEAN-CLAUDE SCHNEIDER
Browne, Schuyler + Beveridge
ATTORNEYS

United States Patent Office 3,328,955
Patented July 4, 1967

3,328,955
DEVICE FOR SECURING ONE END OF A WATCH REGULATING BALANCE-SPRING TO A CONNECTING MEMBER
Jean-Claude Schneider, La Chaux-de-Fonds, Switzerland, assignor to Fabrique d'Horlogerie Chs. Tissot et Fils S.A., Le Locle, Switzerland, a company limited by shares
Filed Aug. 6, 1965, Ser. No. 477,838
Claims priority, application Switzerland, Sept. 25, 1964, 12,462/64
7 Claims. (Cl. 58—115)

The present invention relates to a device for securing one end of a watch regulating balance-spring to a connecting member.

A great number of devices of this type are known already. Generally the securing of the ends of the regulating balance-spring to the outer connecting member formed by the balance-spring stud and to the inner connecting member formed by the collet is obtained either by means of a locking member such as a screw, a key, or, in the case of the inner end, by means of an annular member cooperating with the collet or else by adherence, i.e. by glueing or forcing the balance-spring to a portion of the connecting member.

The devices which realize the fixing by adherence cannot be disassembled. Moreover they often require operations which are not easily adapted to the manufacture in series. On the other hand the devices which comprise a locking member may entrain deformations of the balance-spring which are difficult to check. Moreover the manufacture of these known devices is rather wearsome since it requires machining operations on several pieces which have then to be adjusted to each other.

The prime object of the present invention is to realize such a securing device the construction and manufacturing of which are of optimum simplicity.

To this end the device according to the present invention is characterized in that said member is formed of one piece having a guiding element radially guiding a portion of the balance-spring near said end, and at least a hooking hollow distinct of said guiding element and in which is engaged a bend of the balance-spring preventing tangential displacement of said end.

Other features and advantages of the invention will become apparent from the description now to follow, of two embodiments thereof, given by way of example only, and in which reference will be made to the accompanying drawings, in which.

Figure 1:
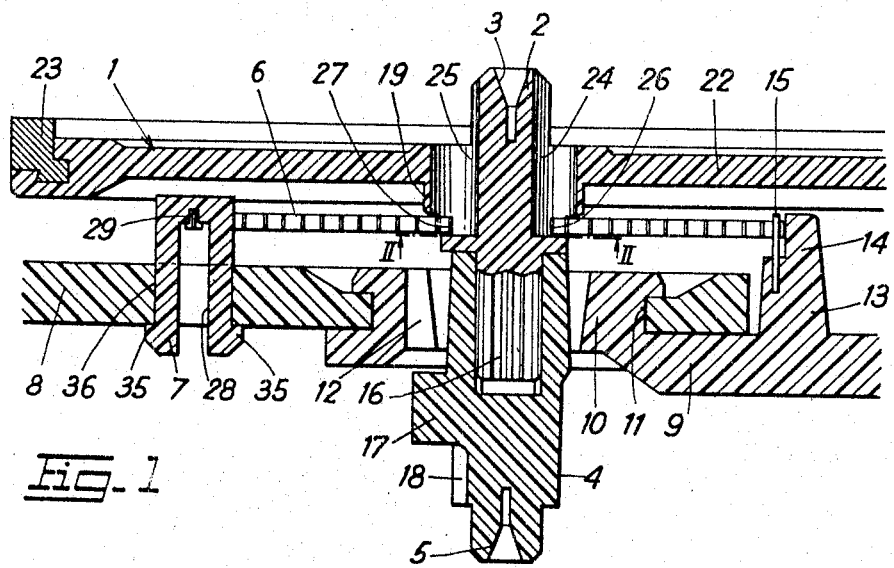
FIG. 1 is an axial sectional view through parts of a regulating mechanism of a watch comprising both embodiments of the device according to the invention.

Referring now to the drawings reference numeral 1 designates a balance the shaft of which comprises a first portion 2, made of one piece with the remainder of the balance and having at its upper end a bearing housing 3, and a second portion 4 engaged by the portion 2 and provided at its lower end with a pivoting housing 5. The balance 1 pivots between a bottom plate and a bridge (not shown) of an alarm watch movement. To the balance 1 there is attached the inner end of a regulating balance-spring 6 the outer end of which is attached to a stud 7 carried by an intermediate bridge 8. The balance-spring 6 extends beneath the balance 1. The bridge 8 forms a pallet-cock. It is traversed by the portion 4 of the balance shaft. The bridge 8 further serves as pivoting member to an index or regulator 9 having at one of its ends an annular portion 10 the outer surface of which forms a cylindrical shoulder 11 fixed to a circular opening of the bridge 8. The annular portion 10 has a hollow 12 the role of which shall be explained later on. The index or regulator 9 presents also a toothed sector (not shown) meshing with a control pinion affording for the regulating operations. A stud 13 projects beyond the regulator 9 and forms as at 14 the balance-spring buckle or boot. It carries a pin 15 engaged between the last and last but one of the outer coils of the balance-spring 6.

The two portions 2 and 4 of the balance shaft have corresponding grooves 16 which makes that these two portions are connected with each other for rotation. The lower portion 4 further has a lateral projection 17 which forms the impulse or roller pin, and below of said projection a hollow 18 affording for the passage of the dart of the pallet during unlocking and impulsion. As is visible on FIG. 1 the hollow 12 affords for the introduction of the shaft (2, 4) into the central opening of the ring 10 whereby the sides of this opening are adapted to maintain the shaft in approximately vertical position during the assembling of the watch movement.

Figure 2:
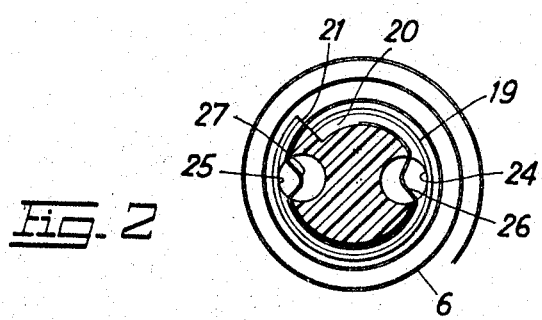
FIG. 2 is a sectional view taken along the line II—II of FIG. 1 in direction of the arrows.

In order to permit fixation of the inner end of balance-spring 6, the portion 2 of the balance shaft has a shoulder 19 of spiral-shaped section as visible in FIG. 2. At the lower end of this shoulder extends a shoulder 20 of invariable width and the side of which forms a regulated surface of spiral shape corresponding to the dimensions of the inner coil of balance-spring 6. A radial plane 21 connects both ends of these spirals. As is seen in FIG. 1 the shoulder 19 is situated immediately below a circular plain disc 22, which extends horizontally and at the periphery of which is secured an annular felloe 23. This felloe is metallic while the remainder of the balance 1 is of plastic material. The upper portion of shaft 2 upwardly projects beyond the center portion of disc 22. Two cylindrical openings 24 and 25 diametrically opposite with respect to the balance shaft are made in the shaft 2 parallely to its axis so that their generatrix farthest away from the balance axis are at equal distances from the shoulder 19. These openings 24 and 25 extend up to the shoulder 20 and form in the side of this shoulder two symmetrical hollows. The last coil of the spiral extends along the spiral side of the shoulder 20. It presents bends 26, 27 each extending into one of said hollows 24, 25. These bends may easily be made after the balance-spring has been engaged on the shoulder 20 by means of a tool adapted to shape both bends simultaneously by clamping. Once provided with the bends the balance-spring tends to remain applied against the side of the shoulder 20 owing to its rigidity while the bends 26 and 27 prevent its displacement in tangential direction. In this manner a permanent connection between the inner end of the balance-spring and the balance shaft is obtained.

Figure 3:
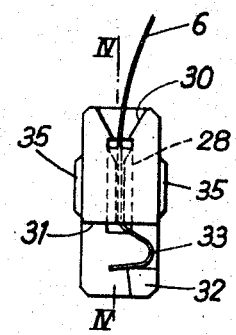
FIG. 3 is a top view of a connecting member to which is attached the outer end of the balance spring of FIG. 1.

The securing of the outer end of balance-spring 6 to the stud 7 is realized according to the same principle. The stud 7 forms a moulded piece of plastic material of prismatic shape presenting a central housing 28 opening into its lower face. This housing is of rectangular cross-section as seen in FIG. 3. Its base further is provided with a narrow elongated groove 29. Two hollows 30 and 31 formed during molding in the upper face of stud 7 afford for a communication of the ends of the groove 29 with the exterior. The hollow 30 has an entry of triangulate shape with vertical faces opening into the housing 28 while the hollow 31 is bordered by a vertical face perpendicular to the groove 29. The base of both hollows is flat. The hollow 31 is bordered on the one side by a projecting member 32 forming a stop. The securing of the outer end of the balance-spring 6 to the stud 7 is obtained by engagement of this end in the entry of the hollow 30 and in the groove 29. The balance-spring is then guided in axial direction and in radial direction as well on the one hand by the sides of the groove 29 and on the other hand by the base of the hollows 30 and 31 and by the base of the groove 29. The stud 7 being removable it may be placed with the balance and the balance-spring 6 on a counting machine for determination of the length of the balance-spring. The counting operations may be effected with a segment of more or less length of the end of the balance-spring extending beyond the stud 7. It is sufficient to make the balance-spring 6 slide in groove 29 to adjust the balance-spring to the desired length. Once said length obtained the balance-spring is severed and bent at its end in the groove 29 in the hollow 31 so as to form a bend 33 maintained clamped between the stop 32 and the side of hollow 31.

Figure 4:
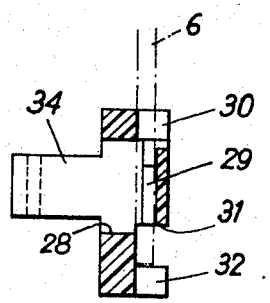
FIG. 4 is a section taken along the line IV—IV of FIG. 3.

As appears from FIG. 4 the stud 7 presents in its central portion two wall elements 34 which extend downwardly parallelly to each other. These wall elements each have a lateral outer nose 35 limited by a plane shoulder which extends at a certain distance from the inner face of the stud, which distance is equal to the thickness of bridge 8. By resilient deformation it is possible to engage the wall elements 34 into a square opening 36 in the bridge 8. The noses 35 then are engaged underneath the lower face of bridge 8 and maintain the stud in place. As the device for securing the inner end of the balance-spring the device for securing the outer end just described affords for a securing of the balance spring without necessitating a locking member or securing operations by adherence such as glueing or forcing, riveting and the like.

In spite of the fact that the described balance does not comprise an independent collet since the inner end of the balance-spring is directly secured to the side of the shoulder 20 the indexing of the regulator may be easily effected since the balance shaft is made of two pieces. As a matter of fact both these pieces may be axially separated from each other and then angularly stepped to the desired amount and again connected for rotation. However the described securing devices could also in other embodiments comprise as connecting members elements different of the members described above. For example the inner connecting member could form a collet on the balance shaft and engaged on the upper end thereof. The balance-spring would then be situated above of the balance and the stud would be secured to the balance cock.

I claim:
1. In combination, a watch regulating balance-spring having an end coil, said end coil having a first undeformed portion adjacent to the extremity of said coil and a permanently deformed portion adjacent to said first undeformed portion, a connecting member including a first spring support surface receiving and guiding said first portion of the spring, said connecting member having a recess receiving said deformed portion of the spring to connect and retain the balance-spring with respect to the connecting member in a tangential sense, said coil having a second undeformed portion, said connecting member including a second support surface guiding and receiving said second undeformed portion of said coil on the opposite side of said recess.

2. The combination defined in claim 1 wherein said connecting member has a side face of the same shape as the spring coil and centered with respect to the longitudinal axis of the connecting member, said recess being provided in said face and dividing it into two surfaces respectively constituting said support surfaces.

3. The combination defined in claim 2, wherein said side face of the connecting member has another recess diametrically opposed to said first recesses, and said spring coil has another permanently deformed portion engaged in said second recess.

4. The combination defined in claim 3, wherein said connecting member has cylindrical openings extending longitudinally thereof and communicating respectively with said recesses, said cylindrical openings having axes parallel to that of the balance-spring and extending to an upper end face of said connecting member.

5. The combination defined in claim 4 further including a balance of a watch movement, and wherein said connecting member is made integral with the balance.

6. The combination defined in claim 5 wherein said side face of said connecting member extends underneath the balance.

7. A connecting member for securing one end of a watch balance-spring or the like, the connecting member comprising a body including an annular shoulder and a spiral peripheral surface adjacent the shoulder for supporting the innermost coil of a balance-spring or the like, and a passage formed longitudinally in the body along an axis eccentric to the longitudinal axis of the body, said passage intersecting said spiral spring support surface to define a radial recess in said support surface dimensioned to receive a deformed portion of the innermost coil of a balance-spring or the like for securing the latter to the connecting member, a coil spring including an innermost coil having an undeformed extremity received in said recess, said innermost coil having a second undeformed portion adjacent said deformed portion engaged against said spiral support surface on the other side of said recess.

References Cited

UNITED STATES PATENTS 2,335,974    12/1943    Simpson _____ 58—115

FOREIGN PATENTS 800,562    11/1950    Germany.
324,254    10/1957    Switzerland.

RICHARD B. WILKINSON, *Primary Examiner.*

GERALD F. BAKER, *Examiner.*

M. LORCH, *Assistant Examiner.*